US010808617B2

(12) United States Patent
Farah et al.

(10) Patent No.: US 10,808,617 B2
(45) Date of Patent: Oct. 20, 2020

(54) SPLIT-ZONE FLOW METERING T-TUBE (71) Applicant: One Financial Plaza, Farmington, CT (US)

(72) Inventors: Jorge I. Farah, Hartford, CT (US); Kalpendu J. Parekh, Colchester, CT (US); Constantine Baltas, Avon, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 574 days.

(21) Appl. No.: 15/134,653

(22) Filed: Apr. 21, 2016

(65) Prior Publication Data
US 2017/0342904 A1 Nov. 30, 2017

Related U.S. Application Data (63) Continuation of application No. 14/429,167, filed as application No. PCT/US2013/028537 on Mar. 1, 2013, now Pat. No. 9,863,319.
(Continued)

(51) Int. Cl.
F02C 7/18 (2006.01)
F01D 9/06 (2006.01)
(Continued)

(52) U.S. Cl.
CPC .............. F02C 7/18 (2013.01); F01D 5/08 (2013.01); F01D 5/18 (2013.01); F01D 9/065 (2013.01);
(Continued)

(58) Field of Classification Search
CPC ..... F01D 5/08; F01D 5/18; F01D 9/06; F01D 9/065; F01D 25/12; F01D 25/14;
(Continued)

(56) References Cited

U.S. PATENT DOCUMENTS 2,258,792 A 4/1941 New
2,936,655 A 5/1960 Peterson et al.
(Continued)

FOREIGN PATENT DOCUMENTS

EP 0791383 8/1997
EP 1142850 10/2001
(Continued)

OTHER PUBLICATIONS

Guynn, Mark, "Analysis of Turbofan Design Options for an Advanced Single-Aisle Transport Aircraft", 2009, American Institute of Aeronautics and Astronautics.*
(Continued)

Primary Examiner — Steven M Sutherland
(74) Attorney, Agent, or Firm — Carlson, Gaskey & Olds, P.C.

(57) ABSTRACT

A gas turbine engine according to an example of the present disclosure includes a fan situated at an inlet of a bypass passage. The fan has a fan diameter, Dfan. A low pressure turbine section is configured to drive the fan and a first compressor section. The low pressure turbine section has a greater number of stages than the first compressor section. The low pressure turbine section has a maximum rotor diameter, Dturb. A ratio of the maximum rotor diameter Dturb divided by the fan diameter Dfan is less than 0.6.

4 Claims, 3 Drawing Sheets

Related U.S. Application Data (60) Provisional application No. 61/707,534, filed on Sep. 28, 2012.

(51) Int. Cl.

| | | |
|---|---|---|
| *F02C 7/12* | (2006.01) | |
| *F02C 6/08* | (2006.01) | |
| *F01D 25/28* | (2006.01) | |
| *F01D 5/08* | (2006.01) | |
| *F01D 5/18* | (2006.01) | |
| *F02C 3/045* | (2006.01) | |
| *F02C 7/20* | (2006.01) | |

(52) U.S. Cl.
CPC .............. *F01D 25/28* (2013.01); *F02C 3/045* (2013.01); *F02C 6/08* (2013.01); *F02C 7/12* (2013.01); *F02C 7/20* (2013.01); *F05D 2250/18* (2013.01); *Y02T 50/675* (2013.01)

(58) Field of Classification Search
CPC .. F01D 25/08; F01D 25/10; F02C 6/08; F02C 7/12; F02C 7/18; F02C 7/20; F02C 7/16; F02C 3/04; F05D 2240/91; F05D 2260/20
USPC ....................................... 60/226.1, 805, 806
See application file for complete search history.

(56) References Cited

U.S. PATENT DOCUMENTS

| | | | |
|---|---|---|---|
| 3,021,731 A | 2/1962 | Stoeckicht | |
| 3,108,767 A | 10/1963 | Eltis et al. | |
| 3,194,487 A | 7/1965 | Tyler et al. | |
| 3,287,906 A | 11/1966 | McCormick | |
| 3,352,178 A | 11/1967 | Lindgren et al. | |
| 3,369,366 A | 2/1968 | Howald | |
| 3,412,560 A | 11/1968 | Gaubatz | |
| 3,664,612 A | 5/1972 | Skidmore et al. | |
| 3,747,343 A | 7/1973 | Rosen | |
| 3,754,484 A | 8/1973 | Roberts | |
| 3,820,719 A | 6/1974 | Clark | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,130,872 A | 12/1978 | Harloff | |
| 4,284,174 A | 8/1981 | Salvana et al. | |
| 4,289,360 A | 9/1981 | Zirin | |
| 4,321,007 A | 3/1982 | Dennison et al. | |
| 4,478,551 A | 10/1984 | Honeycutt, Jr. et al. | |
| 4,649,114 A | 3/1987 | Miltenburger et al. | |
| 4,696,156 A | 9/1987 | Burr et al. | |
| 4,979,362 A | 12/1990 | Vershure, Jr. | |
| 5,102,379 A | 4/1992 | Pagluica et al. | |
| 5,141,400 A | 8/1992 | Murphy et al. | |
| 5,305,616 A * | 4/1994 | Coffinberry | F02C 7/12 60/784 |
| 5,313,779 A | 5/1994 | Rodgers | |
| 5,317,877 A | 6/1994 | Stuart | |
| 5,361,580 A | 11/1994 | Ciokajlo et al. | |
| 5,433,674 A | 7/1995 | Sheridan et al. | |
| 5,447,411 A | 9/1995 | Curley et al. | |
| 5,466,198 A | 11/1995 | McKibbin et al. | |
| 5,524,847 A | 6/1996 | Brodell et al. | |
| 5,634,767 A | 6/1997 | Dawson | |
| 5,677,060 A | 10/1997 | Terentieva et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,223,616 B1 | 5/2001 | Sheridan | |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,517,341 B1 | 2/2003 | Brun et al. | |
| 6,607,165 B1 | 8/2003 | Manteiga et al. | |
| 6,625,989 B2 | 9/2003 | Boeck | |
| 6,672,072 B1 | 1/2004 | Giffin, III | |
| 6,709,492 B1 | 3/2004 | Spadaccini et al. | |
| 6,814,541 B2 | 11/2004 | Evans et al. | |
| 6,883,303 B1 | 4/2005 | Seda | |
| 7,021,042 B2 | 4/2006 | Law | |
| 7,093,419 B2 | 8/2006 | McCaffrey et al. | |
| 7,219,490 B2 | 1/2007 | Dev | |
| 7,287,384 B2 | 10/2007 | Fish et al. | |
| 7,328,580 B2 | 2/2008 | Lee et al. | |
| 7,374,403 B2 | 5/2008 | Decker et al. | |
| 7,591,754 B2 | 9/2009 | Duong et al. | |
| 7,632,064 B2 | 12/2009 | Somanath | |
| 7,662,059 B2 | 2/2010 | McCune | |
| 7,806,651 B2 | 10/2010 | Kennepohl et al. | |
| 7,824,305 B2 | 11/2010 | Duong et al. | |
| 7,828,682 B2 | 11/2010 | Smook | |
| 7,926,260 B2 | 4/2011 | Sheridan et al. | |
| 7,997,868 B1 | 8/2011 | Liang et al. | |
| 8,205,432 B2 | 6/2012 | Sheridan | |
| 8,276,392 B2 | 10/2012 | Van Der Woude | |
| 2006/0228206 A1 | 10/2006 | Decker et al. | |
| 2008/0003096 A1 | 1/2008 | Kohli et al. | |
| 2008/0112791 A1* | 5/2008 | Lee | F01D 9/065 415/58.4 |
| 2008/0116009 A1 | 5/2008 | Sheridan et al. | |
| 2008/0317588 A1 | 12/2008 | Grabowski et al. | |
| 2009/0056343 A1 | 3/2009 | Suciu et al. | |
| 2009/0081025 A1 | 3/2009 | Lutjen et al. | |
| 2009/0314881 A1 | 12/2009 | Suciu et al. | |
| 2010/0105516 A1 | 4/2010 | Sheridan et al. | |
| 2010/0148396 A1 | 6/2010 | Xie et al. | |
| 2010/0212281 A1 | 8/2010 | Sheridan | |
| 2010/0218483 A1 | 9/2010 | Smith | |
| 2010/0331139 A1 | 12/2010 | McCune | |
| 2011/0079020 A1 | 4/2011 | Durocher et al. | |
| 2011/0159797 A1 | 6/2011 | Beltman et al. | |
| 2011/0293423 A1 | 12/2011 | Bunker et al. | |
| 2012/0124964 A1 | 5/2012 | Hasel et al. | |

FOREIGN PATENT DOCUMENTS

| | | |
|---|---|---|
| EP | 2447503 | 8/2011 |
| EP | 2431590 | 3/2012 |
| FR | 1325291 | 4/1963 |
| GB | 1516041 | 6/1978 |
| GB | 2041090 | 9/1980 |
| GB | 2263946 | 8/1993 |
| GB | 2426792 | 12/2006 |
| WO | 2007038674 | 4/2007 |
| WO | 2013067361 | 5/2013 |
| WO | 2014008129 | 1/2014 |

OTHER PUBLICATIONS

Waters, Mark, "Analysis of Turbofan Propulsion System Weight and Dimensions", 1977, NASA Technical Memorandum.*
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.

(56) References Cited

OTHER PUBLICATIONS

Faghri, A. (1995). Heat pipe and science technology. Washington, D.C: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modem Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Gunston, B. (Ed.) (2000). Jane's aero-engines, Issue seven. Coulsdon, Surrey, UK: Jane's Information Group Limited. pp. 510-512.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

International Search Report and Written Opinion for International Application No. PCT/US2013/028537 completed on Nov. 21, 2013.

International Preliminary Report on Patentability for PCT Application No. PCT/US2013/028537, dated Apr. 9, 2015.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

Hendricks, E.S. and Tong, M.T. (2012). Performance and weight estimates for an advanced open rotor engine. NASA/TM-2012-217710. pp. 1-13.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

Kurzke, J. (2008). Preliminary Design, Aero-engine design: From state of the art turbofans towards innovative architectures. pp. 1-72.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

(56) References Cited

OTHER PUBLICATIONS

Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., Macmartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.

Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28(9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76(1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of a C/SiC composites with Si-MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor,R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-31.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Baker, R.W. (2000). Membrane technology and applications. New York, NY: McGraw-Hill. pp. 87-151.
Cheryan, M. (1998). Ultrafiltration and microfiltration handbook. Lancaster, PA: Tecnomic Publishing Company, Inc. pp. 171-236.

(56) References Cited

OTHER PUBLICATIONS

Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.N. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
Mccune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report. Prepared for NASA. NASA CR-165608. pp. 1-178.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Mcardle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
Datasheet. CF6-80C2 high-bypass turbofan engines. Retrieved from https://geaviation.com/sites/default/files/datasheet-CF6-80C2.pdf.
Salemme, C.T. and Murphy, G.C. (1979). Metal spar/superhybrid shell composite fan blades. Prepared for NASA. NASA-CR-159594. Aug. 1979. pp. 1-127.
"Press release. The GE90 engine. Retrieved from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".
Datasheet. GenX™ high bypass turbofan engines. Retreived from: https://www.geaviation.com/sites/default/files/datasheet-genx.pdf.
Supplementary European Search Report for European Patent Application No. 13842149 completed Apr. 19, 2016.

(56) References Cited

OTHER PUBLICATIONS

European Search Report for EP Application No. 18202618.7 dated Feb. 18, 2019.
Winn, A. (Ed). (1990). Wide Chord Fan Club. Flight International, 4217(137). May 23-29, 1990. pp. 34-38.
Parker, R.G. and Lin, J. (2001). Modeling, modal properties, and mesh stiffness variation instabilities of planetary gears. Prepared for NASA. NASA/CR-2001-210939. May 2001. pp. 1-111.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1954). Handbook of practical gear design. Lancaster. PA: Technomic Publishing Company, Inc. pp. 3.96-102 and 8.12-18.
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Product Brochure. Garrett TFE731. Allied Signal. Copyright 1987. pp. 1-24.
Honeywell Learjet 31 and 35/36 TFE731-2 to 2C Engine Upgrade Program. Sep. 2005. pp. 1-4.
Honeywell Sabreliner 65 TFE731-3 to-3D Engine Upgrade Program. Oct. 2005. pp. 1-4.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
About GasTurb. Retrieved Jun. 26, 2018 from: http://gasturb.de/about-gasturb.html.
Kurzke, J. (2001). GasTurb 9: A porgram to calculate design and off-design performance of gas turbines. Retrieved from: https://www.scribd.com/document/92384867/GasTurb9Manual.
Tummers, B. (2006). DataThief III. Retrieved from: https://datathief.org/DatathiefManual.pdf pp. 1-52.
Manual. Student's Guide to Learning SolidWorks Software. Dassault Systemes—SolidWorks Corporation. pp. 1-156.
Macisaac, B. and Langston, R. (2011). Gas turbine propulsion systems. Chichester, West Sussex: John Wiley & Sons, Ltd. pp. 260-265.
Datasheet. CFM56-50 for the Airbus A320ceo family and CFM56-7B for the Boeing 737 family. https://www.cfmaeroengines com/.

Turner, M. G., Norris, A., and Veres, J.P. (2004). High-fidelity three-dimensional simulation of the GE90. NASA/TM-2004-212981. pp. 1-18.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.
Singh, A. (2005). Application of a system level model to study the planetary load sharing behavior. Jounal of Mechanical Design. vol. 127. May 2005. pp. 469-476.
Smith-Boyd, L. and Pike, J. (1986). Expansion of epicyclic gear dynamic analysis program. Prepared for NASA. NASA CR-179563. Aug. 1986. pp. 1-98.
Wikipedia. Torsion spring. Retreived Jun. 29, 2018 from: https://en.wikipedia.org/wiki/Torsion_spring.
AGMA Standard (2006). Design manual for enclosed epicyclic gear drives. Alexandria, VA: American Gear Manufacturers Association. pp. 1-104.
AGMA Standard (1997). Design and selection of components for enclosed gear drives. lexandria, VA: American Gear Manufacturers Association. pp. 1-48.
Daly, M. Ed. (2007). Jane's Aero-Engine. Issue Twenty-three. Mar. 2008. p. 707-712.
AGMA Standard (1999). Flexible couplings—Mass elastic properties and other characteristics. Alexandria, VA: American Gear Manufacturers Association. pp. 1-46.
Wikipedia. Stiffness. Retrieved Jun. 28, 2018 from: https://en.wikipedia.org/wiki/Stiffness.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing, Company, Inc. pp. 400-406.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.

\* cited by examiner

SPLIT-ZONE FLOW METERING T-TUBE

CROSS REFERENCE TO RELATED APPLICATION

This application is a continuation of U.S. application Ser. No. 14/429,167, filed 18 Mar. 2015, which is a National Stage Entry of PCT Application No. PCT/US2013/028537, filed 1 Mar. 2013, which claims priority to U.S. Provisional Application No. 61/707,534, which was filed 28 Sep. 2012, which is incorporated herein by reference.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Turbine engine manufacturers continue to seek further improvements to engine performance and assembly including improvements to thermal, transfer, assembly and propulsive efficiencies.

SUMMARY

A gas turbine engine according to an example of the present disclosure includes a fan situated at an inlet of a bypass passage. The fan has a fan diameter, Dfan. A low pressure turbine section is configured to drive the fan and a first compressor section. The low pressure turbine section has a greater number of stages than the first compressor section, and the low pressure turbine section has a maximum rotor diameter, Dturb. A high pressure turbine section is configured to drive a second compressor section. A ratio of the maximum rotor diameter Dturb divided by the fan diameter Dfan is less than 0.6.

In a further embodiment of any of the foregoing embodiments, the gas turbine engine has a bypass ratio of greater than 10.

In a further embodiment of any of the foregoing embodiments, the high pressure turbine section includes two stages.

In a further embodiment of any of the foregoing embodiments, the first compressor section includes three stages.

In a further embodiment of any of the foregoing embodiments, the fan has a pressure ratio of less than about 1.5.

In a further embodiment of any of the foregoing embodiments, the fan and the first compressor section are configured to rotate at a common speed and in a common direction.

A further embodiment of any of the foregoing embodiments includes a thermal management system configured to receive a cooling stream. The thermal management system includes a metering device located near an outer diameter of the high pressure turbine section. The metering device is configured to divide the cooling stream into multiple segregated passages.

In a further embodiment of any of the foregoing embodiments, the thermal management system is connected to the second compressor section, and the cooling stream is bleed air from the second compressor section.

A gas turbine engine according to an example of the present disclosure includes a fan configured to deliver airflow to a bypass duct. The fan has a pressure ratio of less than about 1.5. A low pressure turbine section is configured to drive the fan and a first compressor section. A high pressure turbine section is configured to drive a second compressor section. The gas turbine engine has a bypass ratio of greater than 10. The fan has a fan diameter, Dfan. The low pressure turbine section has a maximum rotor diameter, Dturb, and a ratio of the maximum rotor diameter Dturb divided by the fan diameter Dfan is less than 0.6.

In a further embodiment of any of the foregoing embodiments, the low pressure turbine section has a greater number of stages than the first compressor section.

In a further embodiment of any of the foregoing embodiments, the high pressure turbine section includes two stages.

In a further embodiment of any of the foregoing embodiments, the first compressor section includes three stages.

In a further embodiment of any of the foregoing embodiments, the fan and the first compressor section are configured to rotate at a common speed and in a common direction.

A further embodiment of any of the foregoing embodiments includes a thermal management system configured to receive a cooling stream. The thermal management system includes a metering device that is configured to divide the cooling stream between a first passage and a second passage that is concentric with the first passage.

In a further embodiment of any of the foregoing embodiments, the metering device includes a plurality of orifices opening to the first passage, and a central orifice opening to the second passage.

A method of designing a gas turbine engine according to an example of the present disclosure includes providing a fan having a fan diameter, Dfan, and providing a low pressure turbine section configured to drive the fan and a first compressor section. The low pressure turbine section has a greater number of stages than the first compressor section. The low pressure turbine section has a maximum rotor diameter, Dturb. The method includes providing a high pressure turbine section configured to drive a second compressor section. A ratio of the maximum rotor diameter Dturb divided by the fan diameter Dfan is less than 0.6. The fan is configured to deliver a portion of air into the first compressor, and a portion of air into a bypass duct, and a bypass ratio, which is defined as a volume of air passing to the bypass duct compared to a volume of air passing into the first compressor, is greater than 6.

In a further embodiment of any of the foregoing embodiments, the high pressure turbine section includes two stages, and the first compressor section includes three stages.

In a further embodiment of any of the foregoing embodiments, the fan has a pressure ratio of less than about 1.5.

In a further embodiment of any of the foregoing embodiments, the bypass ratio is greater than 10.

In a further embodiment of any of the foregoing embodiments, the fan and the low pressure turbine section are configured to rotate at a common speed and in a common direction.

BRIEF DESCRIPTION OF THE DRAWINGS

The various features and advantages of the present disclosure will become apparent to those skilled in the art from the following detailed description. The drawings that accompany the detailed description can be briefly described as follows.

DESCRIPTION

Figure 1:
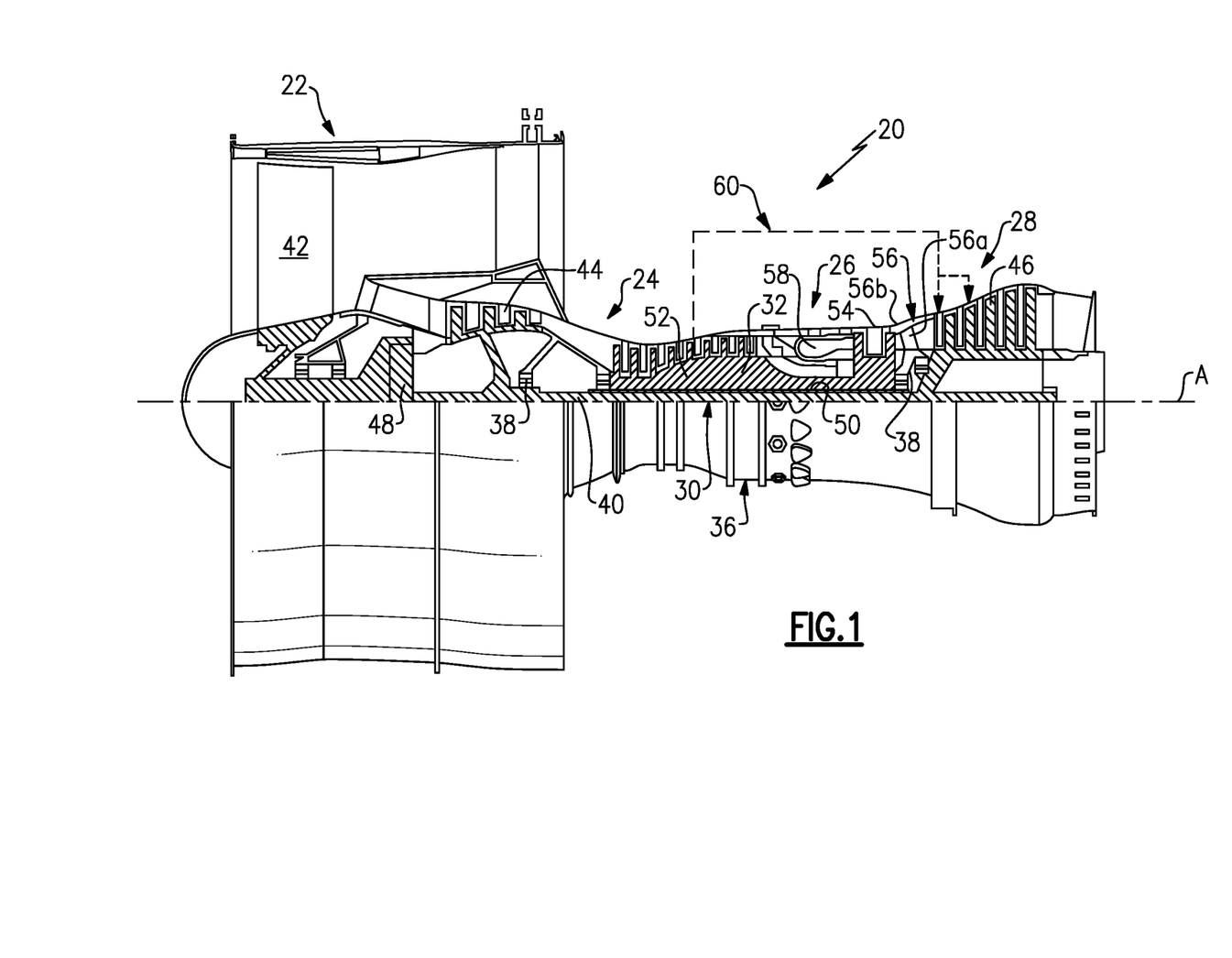
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The compressor section 24, the combustor section 26 and the turbine section 28 constitute a core of the engine 20. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans and the teachings may be applied to other types of turbine engines, including single-spool architectures, three-spool architectures and ground-based turbines that do not include the fan section 22.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure.

The engine 20 also includes a mid-turbine section 56, (or mid-turbine frame, "MTF") having a plurality of airfoil 56a (one shown, here a static vane). The mid-turbine section 56 is located axially between the first turbine 54 (e.g., high pressure turbine, "HPT") and the second turbine 46 (e.g., low pressure turbine, "LPT"). Thus, in this example, the turbine section 28 includes three sections, 46, 54 and 56, which are further considered to be, with no particular implication of the order, first, second and third turbine sections. As can be appreciated, the airfoils 56a orient core gas flow through the turbine section 28 in an axial direction. Aerodynamic loads on the airfoils 56a are transferred to a static engine case 56b, which represents an outer periphery or outer diameter of the engine core (relative to engine central axis A).

An annular combustor 58 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 58, then expanded over the second turbine 54 and first turbine 46. The first turbine 46 and the second turbine 54 rotationally drive, respectively, the first spool 30 and the second spool 32 in response to the expansion.

The engine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about 5. The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan 42 has a fan diameter such that a ratio of the maximum rotor diameter divided by the fan diameter is less than 0.6. It should be understood, however, that the above parameters are only exemplary.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 feet, with the engine at its best fuel consumption. To make an accurate comparison of fuel consumption between engines, fuel consumption is reduced to a common denominator, which is applicable to all types and sizes of turbojets and turbofans. The term is thrust specific fuel consumption, or TSFC. This is an engine's fuel consumption in pounds per hour divided by the net thrust. The result is the amount of fuel required to produce one pound of thrust. The TSFC unit is pounds per hour per pounds of thrust (lb/hr/lb Fn). When it is obvious that the reference is to a turbojet or turbofan engine, TSFC is often simply called specific fuel consumption, or SFC. "Low fan pressure ratio" is the pressure ratio across the fan blade alone, without a Fan Exit Guide Vane system. The low fan pressure ratio as disclosed herein according to one non-limiting embodiment is less than about 1.5. "Low corrected fan tip speed" is the actual fan tip speed in feet per second divided by an industry standard temperature correction of $[(\text{Tram }° R)/(518.7° R)]^{0.5}$. The "Low corrected fan tip speed" as disclosed herein according to one non-limiting embodiment is less than about 1150 feet per second.

As shown schematically in FIG. 1, the engine 20 can utilize a thermal management system 60 to convey relatively cool air, such as from the compressor section 24, to other, relatively hot components. For example, the thermal management system 60 is configured to receive relatively cool air from the compressor section 24 to cool airfoils, such as rotatable blades or static vanes, in multiple turbine stages or sub-sections of the turbine section 28, such as in the turbine sections 46 or 54 and turbine section 56. As can be appreciated, the thermal management system 60 is not limited to use of compressor air or to cooling turbine airfoils.

Figure 2:
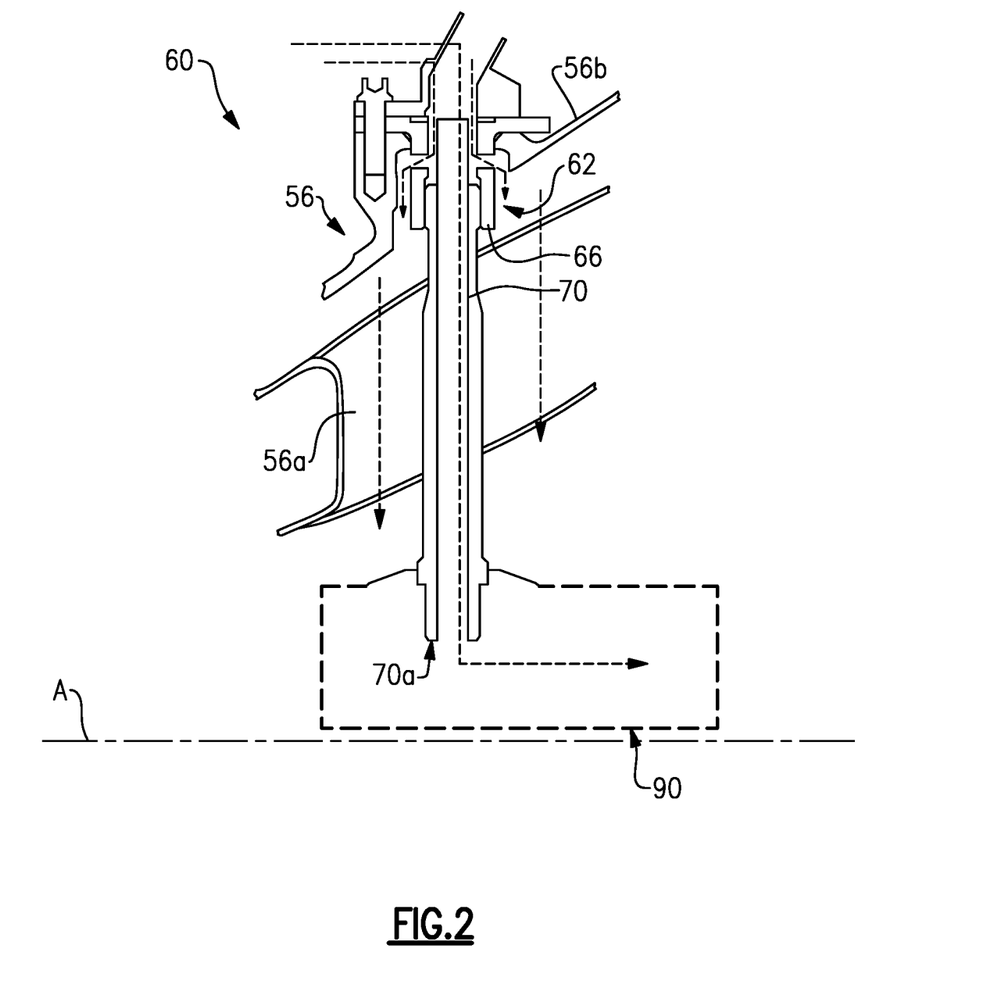
FIG. 2 illustrates a view of a portion of a thermal management system of the gas turbine engine of FIG. 1.

FIG. 2 shows a magnified view of a portion of the thermal management system 60 at the mid-turbine section 56 of the engine 20. As shown, the thermal management system 60 includes a metering device 62 that is located near an outer diameter of the core engine. The outer diameter is represented by the static engine case 56b. In the example shown, at least a portion of the metering device 62 is located radially outwards of the outer diameter of the core engine. A portion of the metering device 62 may extend radially inwards of the static engine case 56b as well, or the entire metering device 62 can be located radially outwards of the static case 56b. For example, at least a portion of the metering device 62 is at the outer diameter.

Figure 3:
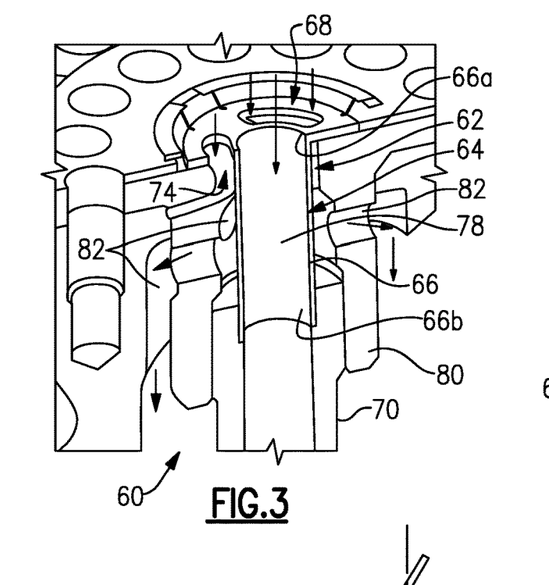
FIG. 3 illustrates a perspective, cutaway view of a metering device of the thermal management system of FIG. 2.
Figure 4:
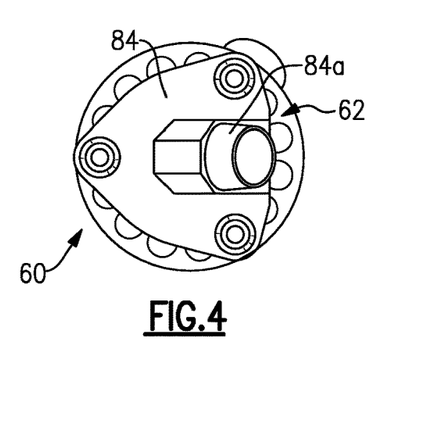
FIG. 4 illustrates a top-down view of the metering device of FIG. 2.
Figure 5:
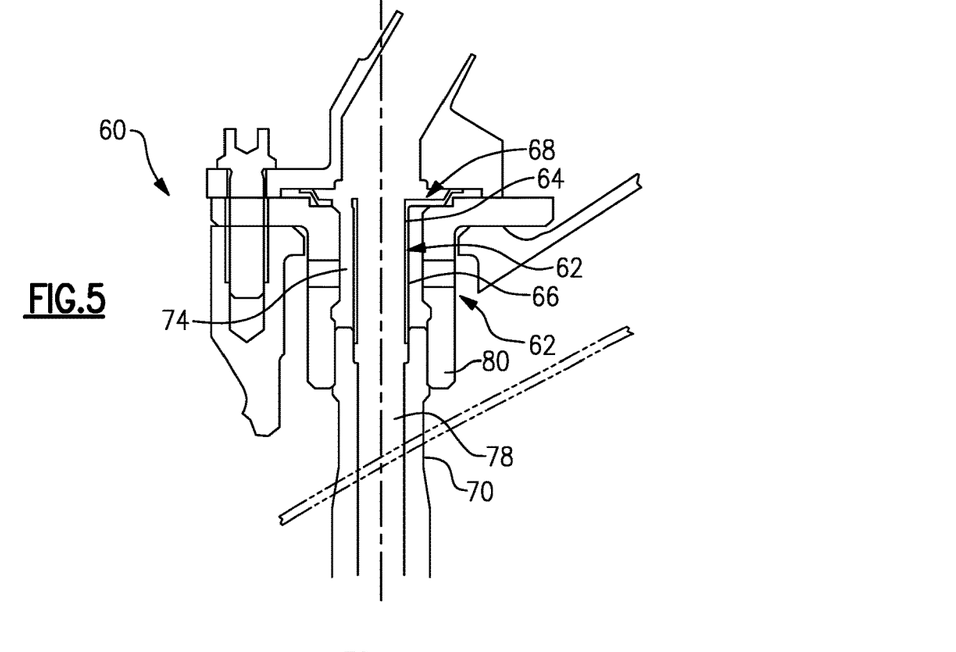
FIG. 5 illustrates a schematic cross-sectional view of the metering device of FIG. 2.

FIG. 3 shows a perspective, partial cutaway view of the metering device 62. FIG. 4 shows a radial view of the metering device 62 according to the view line shown in FIG. 2, and FIG. 5 shows another magnified view of the metering device 62. Referring to FIGS. 2-5, the metering device 62 includes a T-shaped tube 64 that has a tube portion 66 attached at a first end 66a to an orifice plate 68. The tube portion 66 is attached at a second, opposed end 66b to another tube 70 that is arranged coaxially with the tube portion 66. For example, the second end 66b of the tube portion 66 is connected in an interference fit with the tube 70.

Figure 6:
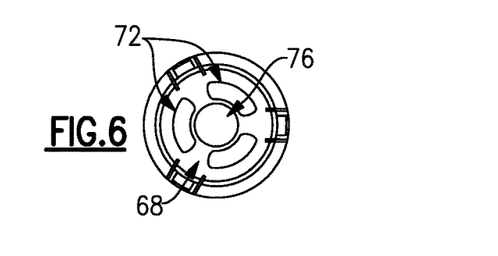
FIG. 6 illustrates a view of an orifice plate of the metering device of FIG. 2.

Referring also to FIG. 6, the orifice plate 68 includes a plurality of orifices 72 that open into a first passage 74 and a central orifice 76 that opens into a second passage 78. In this example, the plurality of orifices 72 that open into the first passage 74 are arranged circumferentially around the central orifice 76 that opens into the second passage 78. As shown, the central orifice 76 is circular and the orifices 72 are non-circular. The disclosed shape and arrangement provides for a compact packaging arrangement, however, in other examples, other shapes could be used as packaging considerations permit.

The second passage 78 extends through the tube portion 66 of the T-shaped tube 64. The first passage 74 is an annular passage that extends between the periphery of the T-shaped tube 64 and an outer tube 80. The outer tube 80 is attached to the tube 70. For example, the outer tube 80 is interference fit with the tube 70 or includes threading or a threaded nut portion for mounting on the tube 70. The first passage 74 is thus concentric with the second passage 78. Additionally, the outer tube 80 includes a plurality of passages 82 that extend along respective axis that are oblique to the axis of the first passage 74 and the second passage 78.

As shown in FIG. 4, a fitting 84 is mounted over the orifice plate 68. The fitting 84 includes a port 84a for connecting the metering device 62 with a cooling stream source, such as the compressor section 24. If connected to the compressor section 24 to receive bleed air, such connections are known and therefore not described in further detail in this description.

Cooling air is provided through the thermal management system 60 into the port 84a and to the metering device 62. The metering device 62 divides the cooling stream into multiple segregated passages, which in the illustrated example include the first passage 74 and the second passage 78. It is to be appreciated however, that the metering device 62 could alternatively be configured to divide the cooling stream into additional segregated cooling passages.

The orifice plate 68, including the plurality of orifices 72 and the central orifice 76, serve to divide the cooling stream between the first passage 74 and the second passage 78. For example, the division of the cooling stream is determined by the relative areas of the plurality of orifices 72 in comparison to the area of the central orifice 76. Thus, by adjusting the relative sizes of the orifices 72/76, the cooling stream can be divided as desired between the first passage 74 and the second passage 78 to thus meter respective flows to the first passage 74 and the second passage 78. The location of the orifice plate 68 near the outer diameter of the core engine can also permit the orifice plate 68 to be relatively easily retrofit into an existing system, and can permit an existing orifice plate 68 to be replaced with a similar or resized orifice plate 68. Further, the orifice plate 68 is a relatively low-cost component and can be accessed at the outer diameter of the core engine without extensive disassembly of engine components.

The flow through the first passage 74 and the second passage 78 can then be provided to different components of the engine 20. For example, the different components can be a first turbine section and a second turbine section that is located downstream from the first turbine section. In a further example, the first passage 74 provides cooling air to the mid-turbine section 56 and the second passage 78 provides cooling air to the first turbine section 46.

The flow of the cooling stream that is conveyed through the central orifice 76 and into the second passage 78 is fed into the tube 70, which extends through the airfoil 56a in the mid-turbine section 56. As shown in FIG. 2, the tube 70 extends into an outer diameter of the airfoil 56a, through the airfoil 56a and out of an inner diameter of the airfoil 56a. The tube 70 terminates at an end 70a in the core engine. For example, the area surrounding the end 70a of the tube 70 may be within a torque box 90 of the engine 20. Thus, the cooling air provided through the tube 70 is fed into the interior of the torque box 90 and then subsequently fed through feed channels to the turbine section 46, for example.

The portion of the cooling stream that is divided and flows through the first passage 74 flows between the periphery of the tube portion 66 and the outer tube 80. The cooling air turns and flows through the plurality of passages 82 and then around an exterior of the outer tube 80 and into the airfoil 56a. This air serves to purge the interior of the airfoil 56a. For example, the cooling air flowing through the first passage 74a enters at the outer diameter of the airfoil 56a, flows through the airfoil 56a, and exits at the inner diameter of the airfoil 56a. This cooling air may then be bled off through leak paths into the core flow through the engine 20.

The thermal management system 60 thus provides a design that permits separate metering of multiple flow streams from a single source stream. Separate metering of multiple flow streams from a single source stream provides discrete air to separate engine components, which benefits flow balancing and safeguards flow disruption to priority cavities. The metering orifices can be provided in appropriate numbers and sizes such to segregate the flow according to the needs of the destination component(s).

Additionally, the disclosed example also provide packaging benefits by reducing the number of external feed lines required and reducing or eliminating a need for separate metering for two flow streams (e.g., MTF cavity and LPT rotor cavity). Engine derivatives can also benefit from metering capabilities and packaging benefits. The disclosed arrangement can also be employed to meter and segregate separate flow streams and can be applied in non-gas turbine applications.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
   a fan configured to deliver airflow to a bypass duct, the fan having a pressure ratio of less than 1.5;
   a low pressure turbine section configured to drive the fan and a first compressor section, wherein the low pressure turbine section has a greater number of stages than the first compressor section and the first compressor section includes three stages;
   a high pressure turbine section configured to drive a second compressor section, wherein the high pressure turbine section includes two stages;
   wherein the gas turbine engine has a bypass ratio of greater than 10;
   wherein the fan has a fan diameter, Dfan, the low pressure turbine section has a maximum rotor diameter, Dturb, and a ratio of the maximum rotor diameter Dturb divided by the fan diameter Dfan is less than 0.6; and
   a thermal management system configured to receive a cooling stream, the thermal management system including a metering device that is configured to divide the cooling stream between a first passage and a second passage that is concentric with the first passage.

2. The gas turbine engine as recited in claim 1, wherein the metering device includes a plurality of orifices opening to the first passage, and a central orifice opening to the second passage.

3. The gas turbine engine as recited in claim 1, wherein the thermal management system is configured to receive the cooling stream from the second compressor section.

4. The gas turbine engine as recited in claim 3, wherein the thermal management system is configured to deliver the cooling stream to at least one of the high pressure turbine section and the low pressure turbine section.

* * * * *